US007538887B1

(12) United States Patent
Tang

(10) Patent No.: US 7,538,887 B1
(45) Date of Patent: May 26, 2009

(54) TEMPORAL INTERFEROMETRIC SIGNAL MODELING WITH CONSTANT PHASE SHIFT IN WHITE LIGHT INTERFEROMETRY

(75) Inventor: Shouhong Tang, Tucson, AZ (US)

(73) Assignee: KLA-Tencor Corporation, San Jose, CA (US)

( * ) Notice: Subject to any disclaimer, the term of this patent is extended or adjusted under 35 U.S.C. 154(b) by 439 days.

(21) Appl. No.: 11/588,560

(22) Filed: Oct. 26, 2006

(51) Int. Cl.
*G01B 11/02* (2006.01)
(52) U.S. Cl. .................... 356/497; 356/512
(58) Field of Classification Search ............ 356/479, 356/497, 511–515
See application file for complete search history.

(56) References Cited

U.S. PATENT DOCUMENTS

| 5,666,715 | A | 9/1997 | Zoiss | |
|---|---|---|---|---|
| 6,856,405 | B2 * | 2/2005 | Tang | ............ 356/512 |
| 6,885,461 | B2 * | 4/2005 | Tang | ............ 356/514 |

OTHER PUBLICATIONS

Bruning J.H., Herriott D.R., Gallagher J. E. Rosenfeld D.P, Ehite A.D., and Brangaccio D.J., "Digital wavefront measuring interferometer for testing optical surfaces and lenses", Appl. Opt. 13, 2693-2703(1974).
K. Kinnstaetter, A. W. Lohmann, J. Schwider, and N. Streibl, "Accuracy of phase shifting interferometry," Appl. Opt. 27, 5082-5089(1988).
P. de Groot, "Measurement of transparent plates with wavelength-tuned phase-shifting interferometry," App. Opt., vol. 39, No. 16, 2658-2663(2000).
K. Okada, H. Sakuta, T. Ose, and J. Tsujiuchi, "Separate measurements of surface shapes and refractive index inhomogeneity of an optical element using tunable-source phase shifting interferometry," App. Opt., vol. 29, No. 22, 3280-3285(1990).
S. Tang, "Weighted least-square interferometric measurement of multiple surfaces," U.S. Patent No. 6885461 B2 (2005).
S. Tang, "Non linear phase shift calibration for interferometric measurement of multiple surfaces," U.S. Patent No. 6856405 B2 (2005).
A. Harasaki, J. Schmit, and J. C. Wyant, "Offset of coherent envelope position due to phase change on reflection," Appl. Opt. 40, 2102-2106(2001).
C. Ai, E. L. Novak, "Centroid Approach for estimating modulation peak in broadband interferometry," U.S. Patent #5,666,715(1997).
P. De Groot, X. C. De Lega, J. Kramer, and M. Turzhitsky, "Determination of fringe order in white-light interference microscopy," Appl. Opt. 41, 4571-4578(2002).

(Continued)

*Primary Examiner*—Patrick J Connolly
(74) *Attorney, Agent, or Firm*—Luedeka, Neely & Graham, P.C.

(57) ABSTRACT

A method for determining the surface topography of an object with various surface properties in white light interferometry first generates a set of interferograms, produced by a phase shift driving mechanism supplied with known inputs, obtained from a single reflective surface at the location of the test piece. The sequence of interferograms from the test piece then is used to calibrate a sequence of inputs to the phase shift driving mechanism to compensate for non-linear characteristics of the phase shifting mechanism. The temporal interferometric signal or its transform at each pixel of a set of subsequently acquired interferograms from a test piece then is compared with signals or their transforms modeled with different properties of the measuring surface. The measured surface properties which generate a best match to the modeling surface properties are selected as the desired signal.

15 Claims, 2 Drawing Sheets

OTHER PUBLICATIONS

S. Kim and G. Kim, "Thickness-profile measurement of transparent thin-film layers by white-light scanning interferotry," App. Optics, vol. 38, No. 28, 5968-5973(1999).

P. De Groot and X. De Lega, "Signal modeling for low-coherence height-scanning interference microscopy," App. Opt., vol. 43, No. 25, 4821-4830(2004).

* cited by examiner

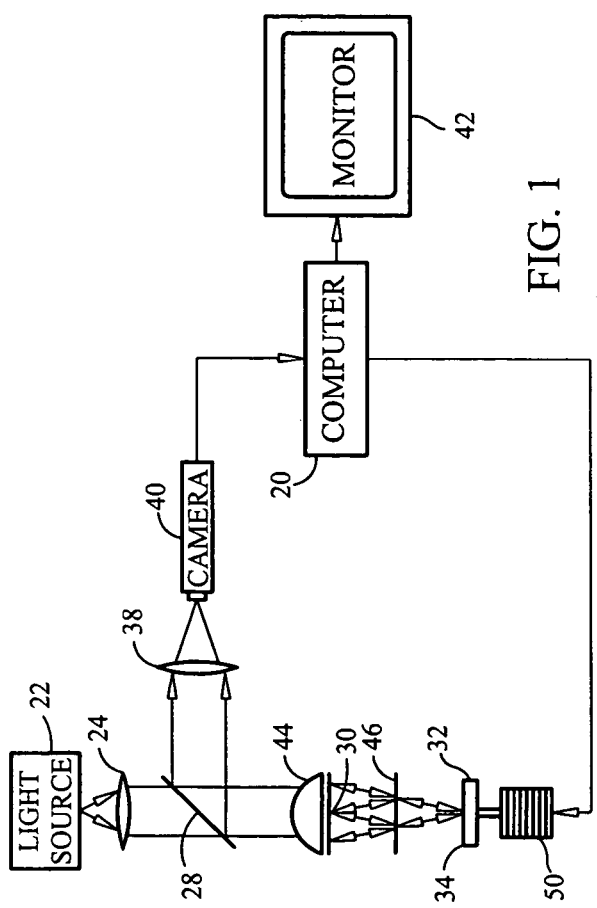
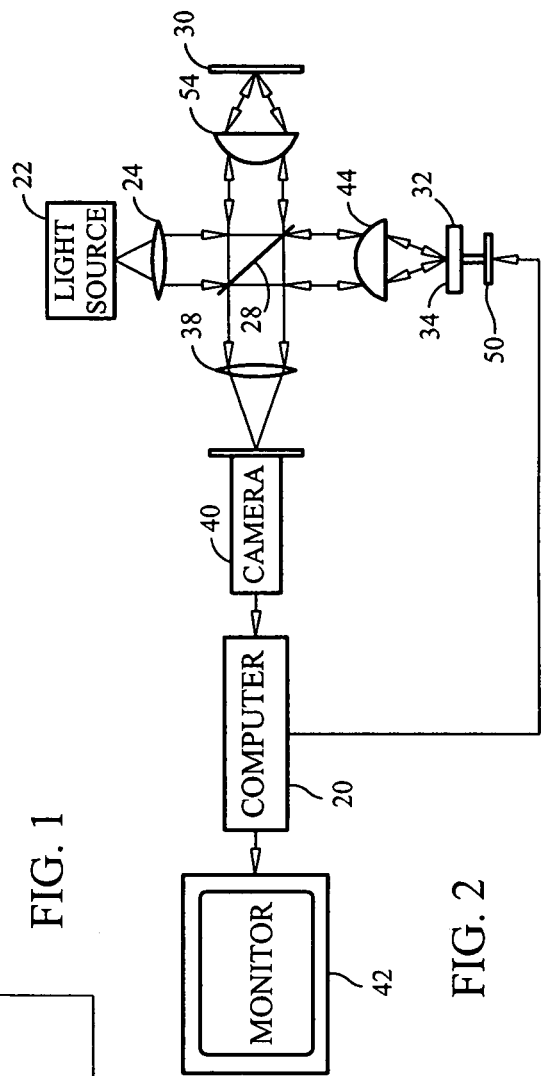

TEMPORAL INTERFEROMETRIC SIGNAL MODELING WITH CONSTANT PHASE SHIFT IN WHITE LIGHT INTERFEROMETRY

BACKGROUND

This invention is related to the field of white light phase shifting interferometry. Phase-shifting interferometry (PSI) has proven to be a highly accurate and efficient method for the measurement of single reflective surfaces in a variety of applications including optical testing, surface profilometry, surface roughness estimation, and surface displacement measurement. PSI was first introduced by Bruning et al. in 1974, *Digital Wavefront Measuring Interferometer for Testing Optical Surfaces and Lenses*, Applied Optics 13, 2693-26703 (1974).

The fundamental concept of PSI is that the phase of an interferogram can be extracted by acquiring a set of a few sequentially phase-shifted interferograms of the original interferogram with a constant phase shift between any two adjacent interferograms (or intensity frames). These phase shifted interferograms are produced by changing the optical path difference (OPD) between a measurement surface and a reference surface, or by changing the wavelength if the OPD is not zero. Thus, all types of PSI measurements rely on some mechanism to shift or change the phase of an interferogram in a regular and predictable manner.

PSI also has been successfully applied to measure an object with multiple reflective surfaces, such as a transparent plate, which produces multiple interferograms superimposed on the recording plane of an interferometer. Such systems are disclosed in the U.S. patent to S. Tang U.S. Pat. No. 6,885,461, and the articles to P. DeGroot, *Measurement of Transparent Plates with Wavelength-tuned Phase Shifting Interferometry*, Applied Optics, Vol. 39, No. 16, 2658-2663 (2000) and K. Okada et al. *Separate Measurements of Surface Shapes and Reflective Index Inhomogeneity of an Optical Element Using Tunable Source Phase Shifting Interferometry*, Applied Optics, Vol. 29, No. 22, 3280-3285 (1990). Each of the interferograms from transparent plates carries topographic information related to its corresponding reflective surface. The phase of each interferogram in the superimposed interferograms shifts at a different speed during the wavelength changes. Consequently, each interferogram is differentiated from the others; and its phase may be extracted from the set of superimposed interferograms, as disclosed in the U.S. patent to S. Tang U.S. Pat. No. 6,856,405.

As disclosed in the Tang '405 patent, in order to obtain precise estimates for the various surface phases, phase shift increments between any two adjacent intensity frames must be calibrated to a known constant. While this condition is desirable for the phase measurement of a single surface, it becomes essential when multiple overlapping interferograms are present and the phase contribution from each reflective surface must be segregated from the other surfaces.

Since 1990, PSI with a spectrally broad band or white light illumination known as vertical scanning interferometry also has been widely used to profile surfaces. Although white light phase shifting interferometry (WLPSI) is capable of measuring surfaces with nanometer precision and with step height greater than one-fourth of a wavelength, the technique is only able to profile objects with uniform surface properties, and without transparent thin films. This is because the complex surface properties, such as bulk surfaces, single or multi-layer film stacks on a substrate, unresolved micro-structures on a substrate, or as part of a film stack, from the testing object create various phase shifts on reflections. Typically, WLPSI loses its ability to profile such objects.

With the introduction of temporal interferometric signal modeling techniques in WLPSI recently, an object with complex surface properties can be measured with improved precision. This signal modeling technique not only obtains the topographic information of the test surface, but also simultaneously or separately determines additional parameters of the test piece, e.g. layer thickness and/or material refractive index for film stacks, or line width and structure depth of micro-structures. Signal modeling techniques may acquire a set of white light phase-shifted interferograms with piezoelectric transducer (PZT) pushers of either the reference flat or the test object. Signal modeling techniques require a constant phase shift between any adjacent interferograms similar to measuring a transparent plate with a tunable laser in PSI. However, the material properties of a PZT cause the phase of interferogram change to be non-linear with respect to the time during the acquisition. Such non-linear phase shifts result in errors in sampling the temporal interferometric signal at each pixel of the interferograms. Such sampling errors greatly deteriorate the measurement accuracy of the signal modeling technique.

SUMMARY OF THE INVENTION

This invention is directed to WLPSI combining signal modeling techniques and a non-linear phase shift calibration to measure objects with complex surface properties.

BRIEF DESCRIPTION OF THE DRAWINGS

FIG. 1 is a schematic diagram of an interferometer useful in practicing embodiments of the invention;

FIG. 2 is a schematic diagram of a different interferometer used in practicing embodiments of the invention.

DETAILED DESCRIPTION

Figure 3:
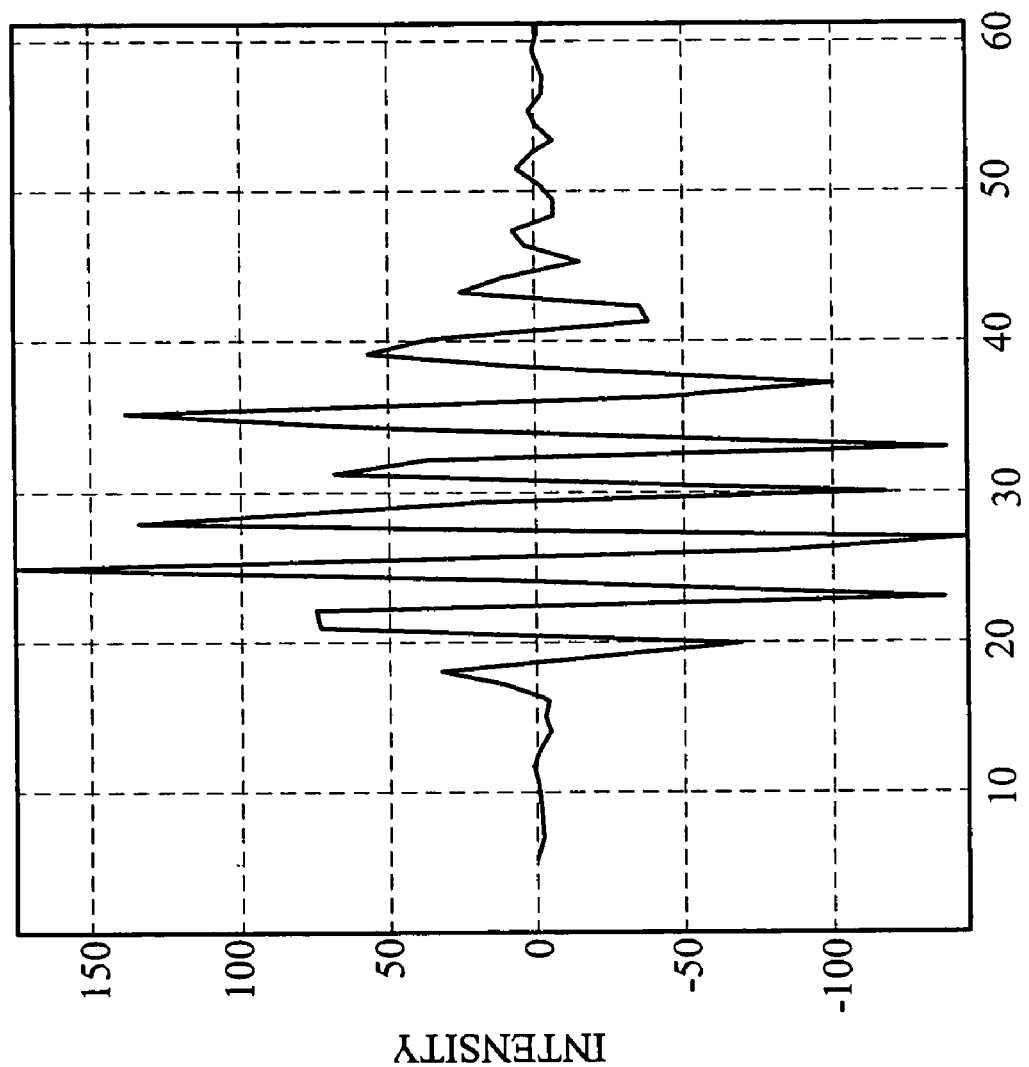
FIG. 3 is a temporal intensity distribution diagram for a pixel of a measuring surface with multiple transparent thin films on it.

FIG. 1 is a schematic diagram of a Mirau interferometer system which may be used in conjunction with the practice of the method of the various embodiments of this invention. As shown in FIG. 1, the interferometer is controlled by a processor or computer 20 which coordinates the operation of a phase shifting driving mechanism 50 with other components of the system. The white light from the source 22 is supplied through a collimating lens 24 to a beam splitter 28 which supplies the collimated light to an objective lens 44. The lens 44 in turn supplies light to a reference flat in the form of a reference mirror 30, and to a further beam splitter 46 in accordance with the conventional operation of such an interferometer.

The reflected light beams from both the reference flat 30 and from both surfaces of a measurement object or test piece 32 are directed by the beam splitter 28 to an imaging lens 38, which supplies simultaneously multiple interferograms to a CCD camera 40, or other suitable recording plane. The camera 40 additionally may include a frame grabber (not shown) for storing images detected by the camera; or the processor 20 may be configured to provide this function. In any event, the images obtained by the camera 40 are supplied to the computer 20 for processing to provide the desired profiles, in a suitable form, for immediate display on a TV monitor 42 or for storage for subsequent utilization.

FIG. 2 illustrates a Linnick interferometer system which may be used in conjunction with the method of the various embodiments of this invention. As is known, a Linnick interferometer uses identical microscope objective lenses, with the lens 44 being duplicated by another lens 54, provided with inputs from the beam splitter 28. The lens 54 then focuses on a reference flat (mirror) 30, whereas the lens 44 focuses on the object 32. The reflected images from both the reference flat 30 and the single or multiple surfaces of the test object 32 are gathered and supplied by the beam splitter 28 to the imaging lens 38 for the camera 40. The circuitry in the processor 20 then processes the information in substantially the same manner as for the Mirau interferometer circuit described previously. It also should be noted that other interferometers which may be used in conjunction with the practice of the methods and embodiments of this invention include Twyman-Green, Fizeau, and Michelson interferometers (none of which are shown)

In conjunction with the practice of the method described subsequently, all of the interferometers described above (including those mentioned in addition to the two specifically shown in FIGS. 1 and 2) are operated with a white light source 22, as described previously. Vertical scanning (parallel) or vertical positioning of the object 32 relative to a reference flat 30 is utilized for measuring the intensity of each pixel in the scan.

As shown in both FIGS. 1 and 2 (and as also would be used in conjunction with the other interferometers mentioned), the step-by-step positioning for each frame of analysis is effected by the processor 20 in synchronization with the operation of the camera 40 by means of a suitable pusher or drive mechanism 50. Ideally, a piezoelectric (PZT) pusher 50 is employed; but a pneumatic pusher or other suitable mechanical pusher may be employed for this purpose. PZT pushers, however, have been found to be highly effective as a means of mechanically moving the object 32 toward and away from the reference flat 30. It should be noted that instead of moving the test piece or object 32 with respect to the reference flat 30, as illustrated in both FIGS. 1 and 2, the pusher 50 could be mechanically or otherwise coupled (by coupling means not shown) to the reference flat 30 to move that surface relative to the surfaces of the test piece 32. The object/test piece 32 and the reference surface 30 are moved in parallel planes relative to one another to produce the repeated measurements for vertical scanning for each of the positions over which the complete scan is made. As is well known, the use of WLPSI allows the entire image field to be captured in one instant, without the need for scanning apertures. This results in profiling with high accuracy over a large range.

In the measurement of multiple parallel surfaces or more complex surfaces as described above, a variety of error sources can induce non-linear phase shift to take place between successive interferograms. Consequently, in order to permit a signal modeling technique to be used effectively with a WLPSI system, it has been found that the combination of such a technique with a non-linear phase shift calibration technique allows measurement of an object with complex surface properties using WLPSI. The calibration technique obtains non-linear phase shift information directly from interferograms; so that all error sources that result in the non-linear phase shift are taken into account, including, but not limited to those caused by the use of PZT pushers. Consequently, the calibration method or technique is able to determine a sequence of physical values used as an input during data acquisition to produce an accurate, repeatable, uniform phase shifting speed crucial to signal modeling in order to allow signal modeling to perform properly. This can be accomplished without the addition of any extra hardware or processor circuits beyond that normally used for the different types of interferometers described. By combining non-linear phase shift calibration with signal modeling, significant improvement in the ability of signal modeling to extract desired information from a set of phase-shifted white light interferograms results.

The phase shift θ in PSI and in WLPSI is a function of time t. It can be expressed as:

$$\theta(t) = \sum_{m=0}^{M} c_m t^m. \tag{1}$$

where $C_m$ is the weight for the sampling intensity. The non-linear phase shift implies M>1 in Equation (1). The phase shift θ can also be expressed as a function of input v(t). That is:

$$\theta(t) = \theta(v(t)). \tag{2}$$

where the input v(t), related to the physical value such as voltage, is also a function of time t. An embodiment of the invention features a calibration technique that finds an input v(t) such that:

$$\theta(t) = C_0 + C_1 t, \tag{3}$$

where $C_O$ and $C_1$ are constants, without adding extra hardware. In other words, an existing non-linear phase shift driving mechanism is made to produce a linear or a constant phase shifting speed during the data acquisition. Such a system and method are disclosed in the above-mentioned patent to Tang U.S. Pat. No. 6,856,405, the disclosure of which is incorporated herein by reference in its entirety.

To determine the input v(t) in a white light interferometer, the phase shift driving mechanism in the interferometer first has to be calibrated with an object 32 having a single reflective surface. A set of interferograms is acquired with a known input $v_m(t)=kt$ from the computer 20 to the phase shift driving mechanism 50 in FIG. 1 and FIG. 2. The initial constant k may be approximately determined if the measurement hardware information is known. Otherwise, a small value k arbitrarily is selected. A mean phase shift from the set of interferograms acquired with the input $v_m(t)$ can be determined in the frequency domain by means of Fourier transform. Assume the set of interferograms can be expressed as x(t), then its Fourier transform is:

$$X(\omega) = \sum_i x(t) e^{-j\omega t} \tag{4}$$

and its energy density spectrum is:

$$S(\omega) = |X(\omega)|^2 \tag{5}$$

This is the distribution of phase-shifting energy in the frequency domain. The mean phase shift is equal to the angular frequency $\omega_m$ where the maximum of S(ω), 0<ω<π, occurs. Now k is modified by:

$$k_{new} = k_{old} \frac{\Theta}{\omega_m} \tag{6}$$

where Θ is the desired phase shift between adjacent interferograms. Θ=π/2 in most applications. The above process is repeated until $|\Theta - \omega_m| < \pi/180$.

After $v_m(t)$ is obtained from the above linear phase shift calibration, the non-linear phase shift calibration is started. A phase shift $\theta_m(t)$ is achieved from a set of interferograms acquired by the input $v_m(t)$. That is, for a given pixel location (x,y) the phase shift θ at the pixel for the k-th frame of the interferograms can be calculated by:

$$\theta_k(x, y) = \cos^{-1} \frac{I_{k+2}(x, y) - I_{k-2}(x, y)}{2(I_{k+1}(x, y) - I_{k-1}(x, y))}, \quad (7)$$

where $I_k(x,y)$ is the intensity value at the pixel position (x,y) in the k-th interferogram. The mean phase shift $\theta_m(k)$ for the k-th frame interferogram is the mean of phase shifts calculated only at pixels where $I_{k+1}(x,y)-I_{k-1}(x,y)$ > mean of all $I_{k+1}(x,y)-I_{k-1}(x,y)$. If the set of interferograms acquired from an interferometer is noisy, the phase shift $\theta_m(t)$ calculated from it may need additional processing to smooth the results, such as by using a least-squares fitting technique to approximate $\theta_m(t)$ with a polynomial $P_m(t)$:

$$P_n(t) = \sum_{k=0}^{n} a_k t^k, \quad (8)$$

where $n \geq 2$ and $a_k$ is a constant. After $\theta_m(t)v$ achieved with input $v_m(t)$, a new known non-linear input can be obtained by:

$$v(t) = \frac{\Theta t v_m(t)}{\theta_m(t)}. \quad (9)$$

The above non-linear phase shift calibration process is repeated by using the calculated v(t) as new $v_m(t)$ until the linearity of phase shift $\theta_m(t)$ is satisfied.

The non-linear phase shift calibration also can be done with the derivatives of $v_m(t)$ and $\theta_m(t)$. Similar to Equation (9), a new derivative of the non-linear input can be expressed as:

$$v'(t) = \frac{\Theta v'_m(t)}{\theta'_m(t)} \quad (10)$$

Thus, the new non-linear input becomes:

$$v(t) = \int \frac{\Theta v'_m(t)}{\theta'_m(t)} dt + v_0, \quad (11)$$

where $v_O$ is a constant.

Once the phase shift calibration has taken place, the non-linear input v(t) can be used for the ongoing measurement of an object 32 with complex surfaces. This is done for n frames of data using the calibrated non-linear input steps v(t). The temporal interferometric signal x(z) at a pixel of the recording plane from a white light phase-shifting interferometer can be expressed as:

$$x(z) = \int_0^\infty F(k)(1 + \int_0^{\theta_0} \cos(2k \cos\theta(z-h) + \phi(k,\theta))\sin\theta \cos\theta d\theta)dk, \quad (12)$$

where z is the distance of the reflecting point from the focus, h is the distance of the reference mirror from the focus, k is the wavenumber, $\theta_O$ is related to the numerical aperture of the objective or N.A.=$\sin\theta_O$, $\phi((k,\theta)$ is the phase offset resulting from the reflectance phase of the measuring surface and the spectral modulation phase; and F(k) is the modulation amplitude. F(k) can be expressed as:

$$F(k) = R(k)R_g(k) = R_f(k), \quad (13)$$

where $R_g(k)$ is the amplitude of spectral distribution of the light source, and R(k) is the reflectance amplitude of the measuring surface. Equation 12 is used by way of example, and other expressions of a temporal interferometric signal in either a different or more general form may be substituted for equation 12.

A typical temporal interferometric signal of Equation (12) is depicted in FIG. 3. Various associated signals can be derived from this signal, such as its temporal amplitude, its temporal phase, or the spectral amplitude of its Fourier transform. One, two or more signals are selected to compare with a group of corresponding signals modeled with different properties such as film thicknesses, refractive indexes, height, etc, of the measuring surface. Once an optimum or best match is found, the measuring surface properties, such as film thicknesses, refractive indexes and height are determined from the modeling surface properties that generate the optimum or best match signal or signals.

In summary, the frames of interferometric signals are gathered from an interferometer, such as those discussed above and two examples of which are shown in FIGS. 1 and 2. After the non-linear phase shift calibrations have been effected by the computer 20, n frames of data are acquired while the white light fringe pattern from the light source 22 is scanning through the field of view, with the frames having a plurality of pixels. Depending upon the specific property which is the object of the interferometric test being conducted, a comparison is made by the computer 20 with the appropriate model signal to determine the best match, as mentioned above. Once a match has been determined, the particular information, based on the model with which the comparison is being made, is selected to provide the output from the computer 20 to the monitor 42, or other output device, for subsequent utilization.

The foregoing description of embodiments of the invention is to be considered as illustrative and not limiting. Various changes and modifications will occur to those skilled in the art for performing substantially the same function, in substantially the same way, to achieve substantially the same result, without departing from the true scope of the invention as defined in the appended claims.

What is claimed is:

1. A method for analyzing a surface of a test object having surface properties using white light interferometry and a phase-shifting interferometer having a reference surface, the method including: positioning a reflective surface at a location corresponding to a test object location in the interferometer; using a phase shift driving mechanism to change the relative distance between the reflective surface and the reference surface; applying a first input to the phase shift driving mechanism to acquire a first plurality of interferograms from the interferometer; determining a mean phase shift from the plurality of interferograms; generating a second input to the phase shift driving mechanism of the interferometer to acquire a second plurality of interferograms; calibrating non-linear phase shift results from the second plurality of interferograms to change the second input supplied to the phase shift driving mechanism of the interferometer to produce linear phase shift results; replacing the reflective surface with the test object; supplying the changed second input to the phase shift driving mechanism to acquire successive pluralities of interferograms from the interferometer; comparing the successively acquired interferograms with corresponding signals modeled with the properties to be measured to determine an optimal match.

2. A method according to claim 1 wherein the first and second inputs to the phase shift driving mechanism comprise at least one of a voltage function, a current function, a temperature function, and a function that comprises a variable t, where t represents time or a function of time.

3. A method according to claim 2 wherein the phase shift driving mechanism comprises a piezoelectric transducer.

4. A method according to claim 3, wherein the first input to the phase shift driving mechanism comprises a driving voltage v(t) and wherein calibrating the non-linear phase shift results produces non-linear increments of the second input to compensate for non-linear operation of the piezoelectric transducer.

5. A method according to claim 4, wherein the modeled signals are selected for a specific one of the surface properties selected from the group consisting of film thicknesses, refractive indexes, height, and surface characteristics.

6. A method according to claim 1, wherein the phase shift driving mechanism comprises a piezoelectric transducer.

7. A method according to claim 6 wherein the first input to the phase shift driving mechanism comprises a driving voltage v(t); and the calibrating the non-linear phase shift results produces non-linear increments of the second input to compensate for non-linear operation of the piezoelectric transducer.

8. A method according to claim 1, wherein the modeled signals are selected for a specific one of the surface properties selected from the group consisting of film thicknesses, refractive indexes, height, and surface characteristics.

9. A system for analyzing a surface of a test object having surface properties, the system comprising: a phase-shifting interferometer using white light and having a reference surface; a reflective surface positioned at a location corresponding to a test object location in the interferometer; a phase shift driving mechanism that changes the relative distance between the reflective surface and the reference surface, the phase shift driving mechanism comprising an input; a processor operatively coupled to the input of the phase shift driving mechanism, the processor including circuitry that provides a first input to the phase shift driving mechanism to change the relative distance between the reflective surface and the reference surface and to acquire a first plurality of interferograms from the interferometer; circuitry that determines a mean phase shift from the plurality of interferograms; circuitry that generates a second input to the phase shift driving mechanism of the interferometer to acquire a second plurality of interferograms; circuitry that calibrates non-linear phase shift results from the second plurality of interferograms and changes the second input, and supplies the changed second input to the phase shift driving mechanism of the interferometer to produce linear phase shift results; wherein the interferometer further comprises a test object location; wherein the processor further comprises circuitry for supplying the changed second input to the phase shift driving mechanism to acquire successive pluralities of interferograms from the interferometer for the test object; and circuitry for comparing the successively acquired interferograms with corresponding signals modeled with the properties to be measured to determine an optimal match.

10. A system according to claim 9 wherein the phase shift driving mechanism is a piezoelectric transducer.

11. A system according to claim 9 wherein the first and second inputs comprise at least one of a voltage function, a current function, a temperature function, and a function which comprises a variable t, where t represents time or a function of time.

12. A system according to claim 10 wherein the input to the piezoelectric transducer from the processor is a driving voltage.

13. A system for analyzing a surface of a test object having surface properties, including a phase shifting interferometer using white light and having a reference surface and a reflective surface location in the interferometer; a phase shift driving mechanism to change the relative distance between the reflective surface location and the reference surface; a processor having a stored sequence of non-linear output signals coupled with the phase shift driving mechanism to produce linear phase shift results from the interferometer; and stored signals corresponding to particular surface properties in the processor for comparison with successively acquired interferograms as the phase shift driving mechanism is supplied with the sequence of non-linear signals from the processor.

14. A system according to claim 13 wherein the phase shift driving mechanism is a piezoelectric transducer.

15. A system according to claim 14 wherein the sequence of non-linear signals supplied from the computer to the phase shift driving mechanism is a driving voltage (Vt) where t represents time or a function of time, and wherein non-linear increments of the driving voltage (Vt) are applied by the processor to the phase shift driving mechanism.

* * * * *